Figure 1:
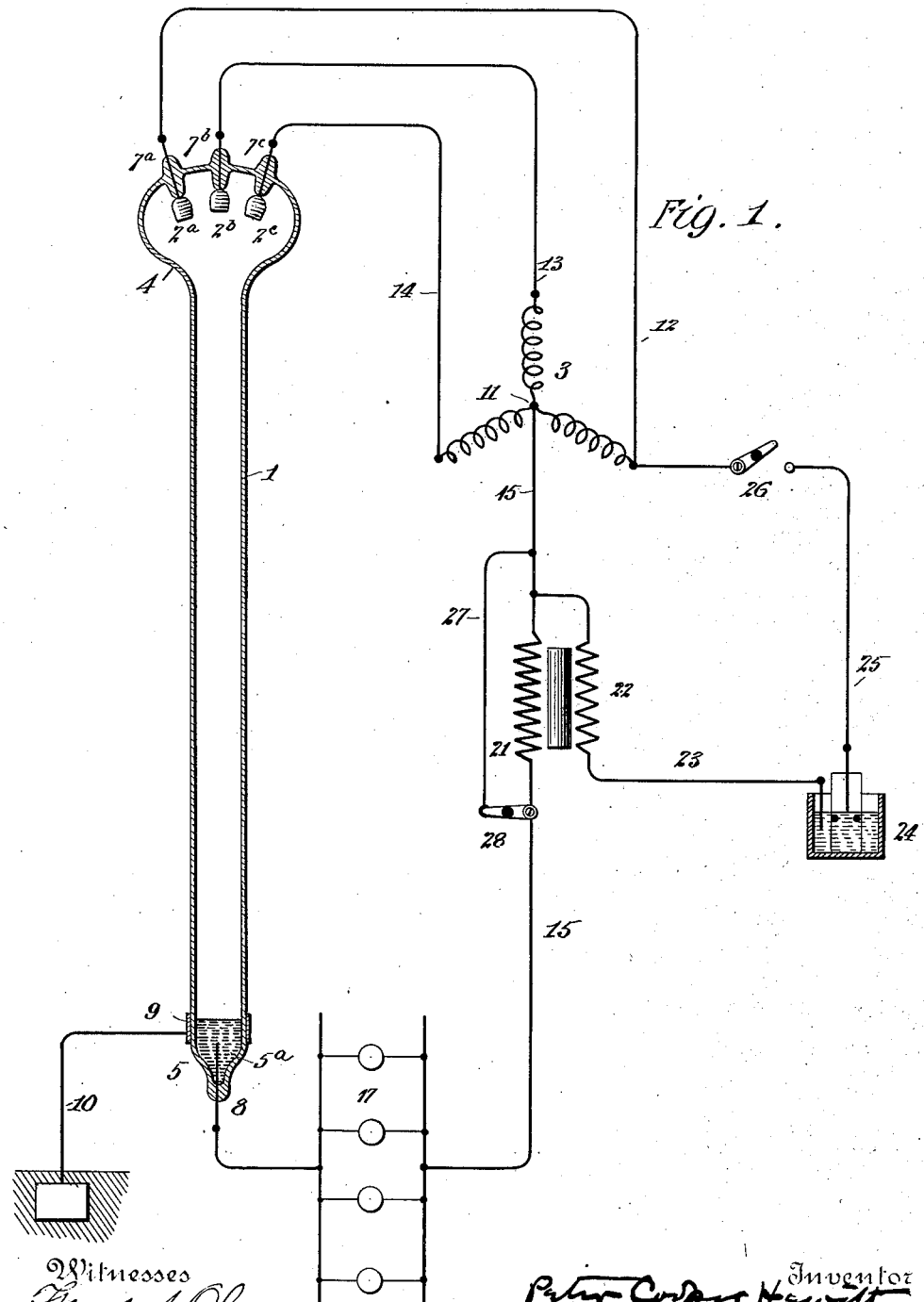

P. C. HEWITT.
METHOD OF ELECTRICAL TRANSMISSION.
APPLICATION FILED OCT. 30, 1902.

1,097,320.

Patented May 19, 1914.

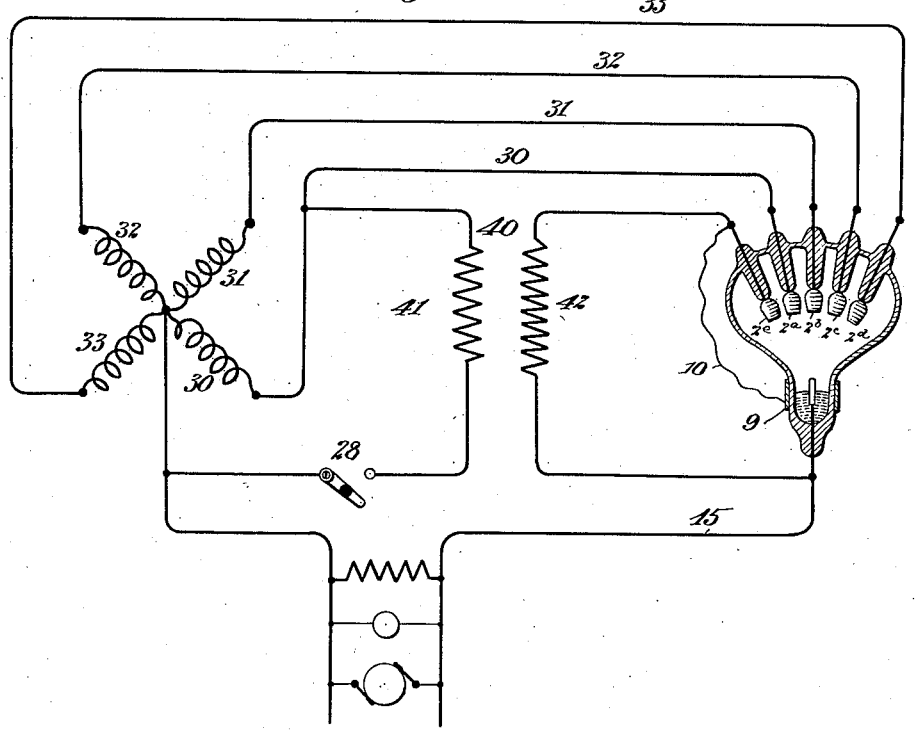

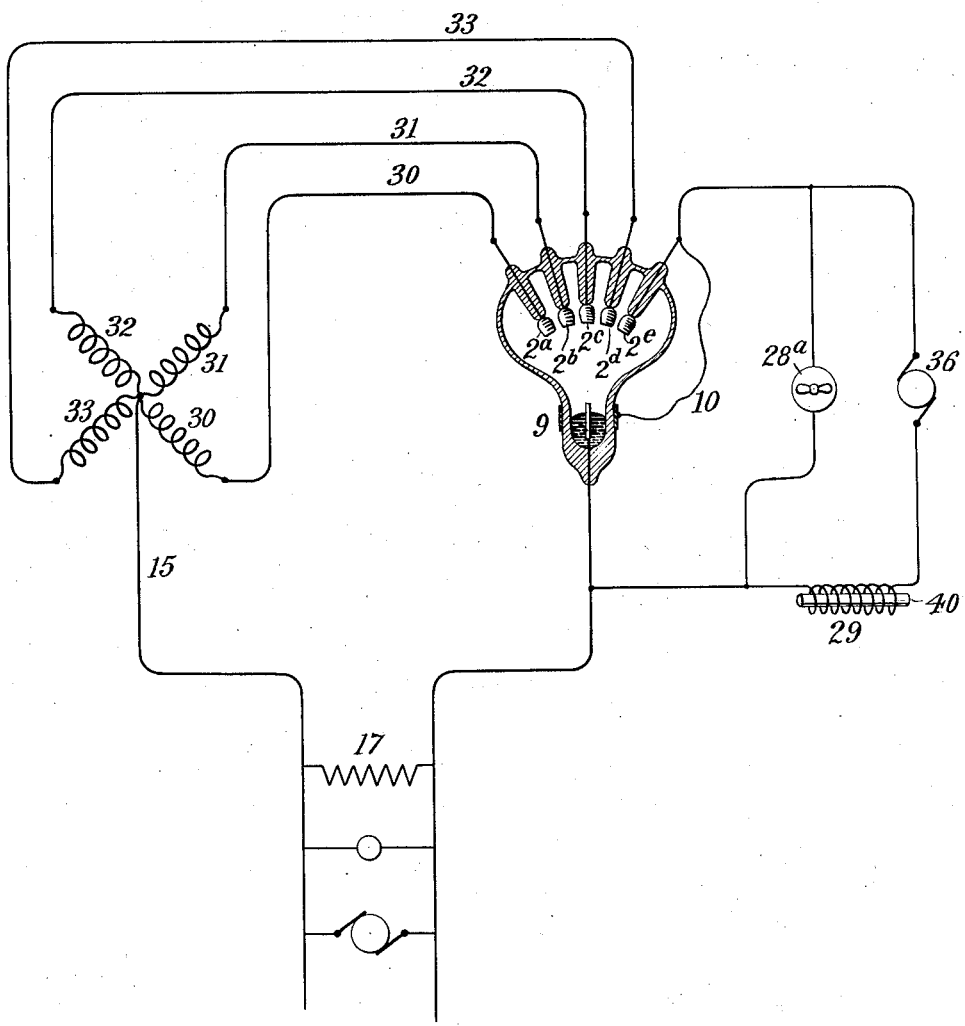

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

METHOD OF ELECTRICAL TRANSMISSION.

1,097,320.  Specification of Letters Patent.  Patented May 19, 1914.

Application filed October 30, 1902. Serial No. 129,353.

*To all whom it may concern:*

Be it known that I, PETER COOPER HEWITT, a citizen of the United States, and a resident of New York, in the county of New York and State of New York, have invented certain new and useful Improvements in Methods of Electrical Transmission, of which the following is a specification.

In the apparatus devised by me and disclosed in certain patents granted to me on the 17th day of September 1901 the following characteristics are to be noted: The principal resistance opposed to the starting of current flow through the device exists at the negative electrode. Once this is broken down or overcome current will pass under the influence of comparatively low electromotive force. The starting resistance at the negative electrode may conveniently be called the negative electrode reluctance. Moreover, so long as this relutcance remains overcome, current may flow to the negative electrode from the original positive electrode or from another positive acting in coöperation with the negative electrode. In this way, among others, the device may be kept alive and may pass current through it to supply a receiving circuit beyond the negative electrode. Accordingly, if a device of this character be provided with several positive electrodes which are connected successively with sources of positive electromotive forces, current may be caused to flow successively through the device from the several positive electrodes, provided that at all times a sufficient electromotive force is developed to prevent the negative electrode reluctance from reëstablishing itself. In all cases the negative electrode reluctance has to be broken down, even though one of the positive electrodes were negative with reference to another. Thus a barrier to the flow of current in the reverse direction is provided by reason of the negative electrode reluctance which would reside at the positive electrode on becoming negative. It is clear that a system having the characteristics could be operated with polyphase alternating electric currents where each phase of the current is provided with a positive electrode and a negative electrode is connected to a neutral point of the source with reference to the several positive electrodes. This applies to the overlapping currents of the three phase system or a system supplying a larger number of phases than three. It is also evident that the system may be employed with a single phase or ordinary two phase alternating current, provided means are employed for keeping the negative electrode reluctance broken down during operation, as by an independent source of direct current. In such cases a supplemental positive electrode will generally be employed. The system may be used for supplying light or for transmitting currents to a work circuit, as desired. In the former case the positive and negative electrode will be separated by such a space as to present a vapor path of considerable length for giving light, as set forth in my Letters Patent 955,459 granted April 19th, 1910. When, however, the device is to be employed for transmitting current of one direction to a work circuit, the length of the container may be selected at will, but in general the use of a long tubular container will be avoided, unless the purpose is to supply light in the device itself and also to transmit energy to a receiving circuit.

Figure 2:
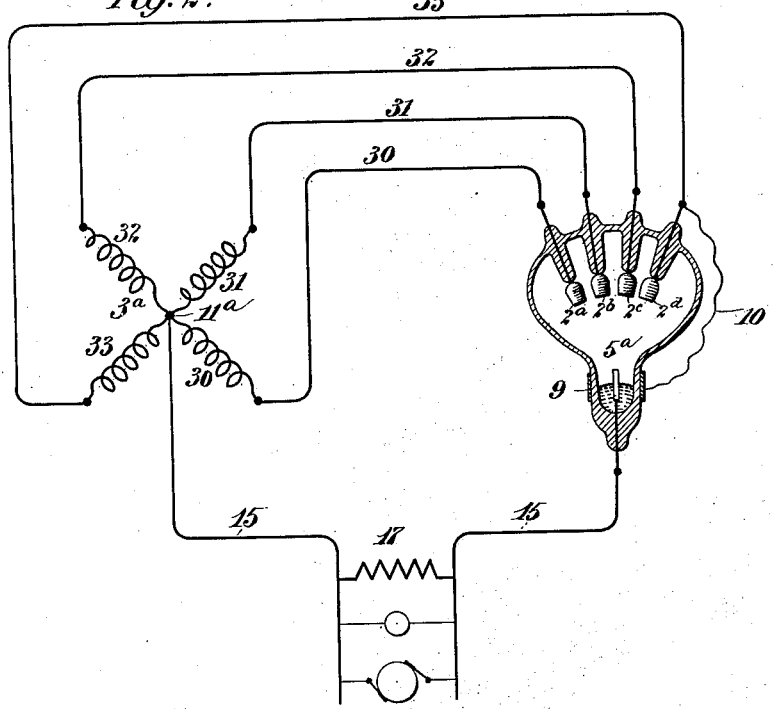
Figure 3:
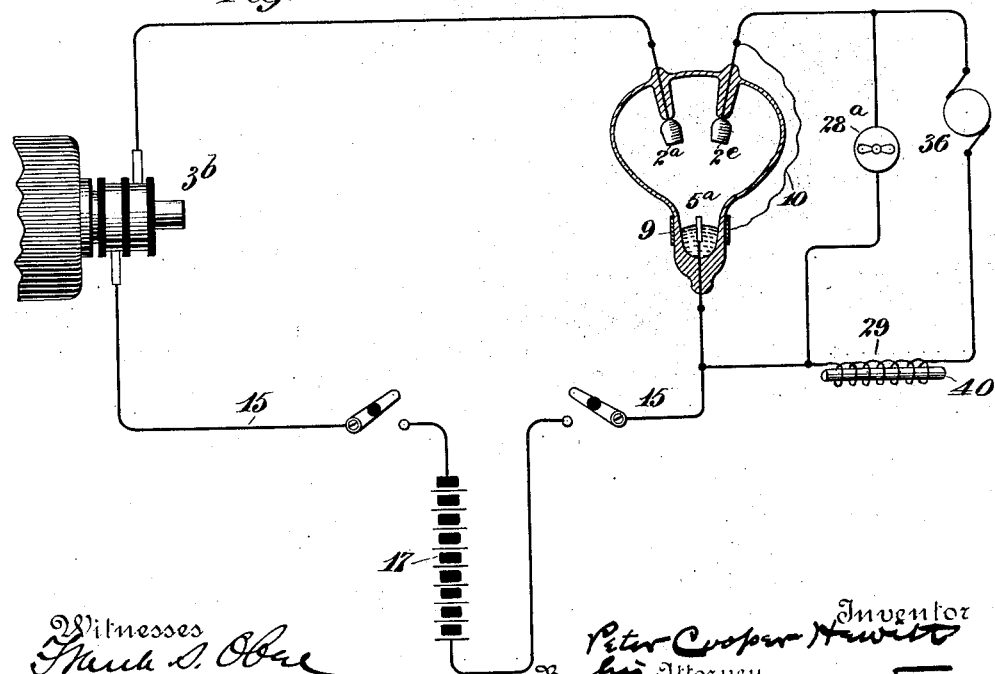

In the accompanying drawings I have illustrated in Figure 1 a device and circuits showing the general organization of the apparatus for three phase currents. Fig. 2 illustrates an arrangement in which a four-phase current is employed; Fig. 3 illustrates an adaptation of the invention to a single phase circuit; Fig. 4 shows the system illustrated in Fig. 2 with the addition of starting devices therefor; and Fig. 5 is a diagram of a four-phase circuit similar to Fig. 2, with the addition of starting devices as illustrated in Fig. 3.

Referring to Fig. 1 of the drawings, 1 represents an inclosing chamber which may be of glass or other suitable material, and $2^a$, $2^b$ and $2^c$, represent three positive electrodes which are suitably supported within the chamber 1, and connected with their respective leading-in conductors, $7^a$, $7^b$ and $7^c$. In the drawing these electrodes are shown as being contained within an enlargement 4. The negative electrode, 5, is shown as consisting, in this instance, of a small body of mercury with which a leading-in wire, 8, makes connection. I have illustrated at 3 a source of polyphase current, in this case, a three-phase generator, or a suitable transformer, adapted to deliver the requisite currents. The respective terminals of the source are connected by conductors, 12, 13 and 14, with the respective positive electrodes 2ª, 2ᵇ and 2ᶜ. The neutral point, 11, of the source is connected by a conductor 15, through any desired circuit, 17, with the leading-in wire 8. For the purpose of starting the device, any suitable means may be employed. I usually surround the portion of the device adjacent to the negative electrode by a conducting band, 9, connected with any one of the conductors leading to the positive electrodes; for instance with the conductor 12, or, it may be connected with the earth. This serves to aid in starting a flow of current through the device. A convenient way of starting the device and overcoming the negative electrode reluctance where the potential employed is not in itself sufficient to insure the starting, is to impress upon the terminals an electro-motive-force higher than that required for its normal operation. This may be done in any convenient way as, for instance, by means of a potential raising device included in any one of the circuits. In the drawings, I have shown the coil 21 included in the conductor 15, this coil acting as a secondary to a primary coil, 22, included in the circuit of a suitable circuit-interrupter such, for instance, as a Wehnelt interrupter, 24, one terminal of the primary coil being connected with the conductor 15 and the other by the conductor 23, with one side of the Wehnelt interrupter, the other side of the Wehnelt interrupter being connected by a conductor 25, with the conductor 12 for instance. A switch 26 may be included in the conductor 25 for controlling its circuit connections, and a conductor 27 with a switch 28 may be employed for short-circuiting or cutting out of circuit, the coil 21. For special reasons the coil 21 may be put in other portions of the circuit, provided it is so arranged as to cause a momentary high electro-motive-force to be impressed upon the terminals of the device. Other means of starting the device may be employed, if desired. When the flow of current has been started it will continue to pass in succession from the several electrodes 2ª, 2ᵇ and 2ᶜ, to the negative electrode 5, the successive electrodes being in effect substituted, the one for another, as the positive electro-motive-force applied to one falls, and the positive electro-motive-force to the succeeding one rises, the essential point being that there is always a sufficient flow of current through the device to maintain it in its conductive condition and to prevent the restoration of the negative electrode reluctance at the negative electrode.

The invention is useful in various cases where it is desired to derive a direct current from an alternating source. In effect such an apparatus as described herein serves the purpose of a rectifying device, whereby currents from a source of alternating electromotive-forces pass through the apparatus and through the circuit connected therewith in one direction. The function and operation of this translating device are substantially the same whether it is itself used alone or as a medium for transmitting current to other translating devices. When the device is to be used for the latter purpose and a lower resistance is desired, the device may be constructed more like the form shown in Figs. 2 and 3, where the negative electrode is in closer proximity to the positive electrodes, reducing the resistance due to the intervening vapor.

In Fig. 2, I have illustrated the invention as employed in connection with a four-phase electric circuit. In this instance, the conductors from the four terminals, 30, 31, 32, 33, of the source 3ª are connected with the four positive electrodes 2ª, 2ᵇ, 2ᶜ and 2ᵈ, while the neutral point 11ª is connected by a conductor 15 through a work circuit 17, with the negative electrode, 5ª, of the device. I have shown the chamber 1 in this figure as being comparatively short in length and of large cross-section, and so constructed that practically no energy is consumed in producing light, the purpose being to utilize the device for producing current continuous in direction for operating the apparatus included in the work circuit.

The device shown in Fig. 2 may be started by the means described and shown in connection with Fig. 1 or Fig. 3, or by means of a high potential induced current of small quantity derived through a transformer from the conductor 15 and one of the conductors 30, 31, 32 or 33. Such induced electro-motive-force may be applied to a supplemental electrode, as illustrated in Fig. 4, for instance, wherein the transformer 40 is shown as having its primary 41 capable of being connected by means of a switch 28 between the conductors 15 and 30, while the secondary, 42, has one terminal connected with an auxiliary electrode, 2ᵉ, and its other terminal with the conductor 15. The starting band 9 in this instance is connected by a conductor 10 with the electrode 2ᵉ.

In Fig. 3, I have illustrated a source, 3ᵇ, of single phase alternating current, having its respective terminals connected with the positive electrode 2ª and the negative electrode 5ª. The supplemental electrode 2ᵉ is connected with the positive terminal of a source, 36, of direct current, the negative terminal of which is connected through a reactive device 29 with the negative electrode 5ª. A switch, 28ª, included in a short-circuit is employed for starting the device, the switch 28ª being a quick-break switch across the terminals of the source 36. Upon suddenly rupturing the short-circuit by operating the quick-break switch 28ª, the reactive device 29 tends to discharge itself through the medium between the positive electrode 2ᵉ and the negative electrode 5ª. The coils of the reactive device may remain in circuit as a steadying resistance, if desired. The source 36 of continuous currents affords a sufficient electro-motive-force to prevent the negative electrode reluctance from reëstablishing itself independently of the action of the electro-motive-forces produced by the generator 3ᵇ. The result will be that an intermittent current in one direction will flow through the conductor 15 and such electrical apparatus as may be included in the work circuit 17, which may be used for electrolytic or other work. Fig. 5 illustrates a system of circuits combining certain features of Figs. 2 and 3. The action of the devices taken from Fig. 3 is fully described in connection with that figure and need not be repeated here.

The claims of this application relate to the method involved in the operation of the device shown and described, the apparatus being claimed in a separate application executed on the same day herewith, said application having been filed on the 30th day of October, 1902, and bearing the Serial Number 129,352. In an application filed by me April 5, 1901, Serial Number 54,485, claims are made broadly upon the method of deriving and utilizing continuous currents from alternating current sources.

I claim as my invention:—

1. The method of impressing current of one direction from an alternating current source upon an electric circuit including a conducting medium of gas or vapor and suitable positive and negative electrodes, the electrodes having a high initial reluctance to starting, which consists in overcoming this reluctance at one electrode and maintaining a low resistance in the desired direction at the said electrode by impressing upon it a continuous electro-motive-force in that direction.

2. The method of deriving from a source of alternating electro-motive-forces a flow of current in one direction, which consists in opposing a negative electrode reluctance to the flow of current in the opposite direction, and maintaining a condition of low resistance in the desired direction due to a continuous impressed electro-motive-force in that direction.

3. The method of operating an electrical device comprising a plurality of positive electrodes, a negative electrode, and an intervening gas or vapor, which consists in impressing upon the device an electro-motive-force in a constant direction, maintaining a flow of current therethrough by reason of such electro-motive-force, and simultaneously impressing upon the device alternating electro - motive - force, thereby causing electric current due to the electro-motive-forces impressed to traverse said device in a given direction.

4. The method of operating an electrical device comprising a plurality of positive electrodes, a negative electrode, and an intervening gas or vapor, which consists in impressing upon the device an electro-motive-force in a constant direction, maintaining a flow of current therethrough by reason of such electro-motive-force, simultaneously impressing upon the device alternating electro-motive-force, and utilizing the reluctance naturally existing at the negative electrode for preventing the flow of current in the reverse direction.

Signed at New York, in the county of New York, and State of New York, this 29th day of October, A. D. 1902.

PETER COOPER HEWITT.

Witnesses:
CHARLES A. TERRY,
WM. H. CAPEL.